United States Patent [19]
Fuhrman

[11] Patent Number: 5,843,508
[45] Date of Patent: Dec. 1, 1998

[54] POTATO PEELING SYSTEM

[75] Inventor: Jeffrey E. Fuhrman, Hanover, Pa.

[73] Assignee: Utz Quality Foods, Inc., Hanover, Pa.

[21] Appl. No.: 791,803

[22] Filed: Jan. 31, 1997

Related U.S. Application Data

[62] Division of Ser. No. 613,219, Mar. 8, 1996, Pat. No. 5,662,034.

[51] Int. Cl.$^6$ .............................. A23L 1/10; A23L 1/216
[52] U.S. Cl. ........................................... 426/483; 426/637
[58] Field of Search .................................. 426/483, 637, 426/482; 99/633, 630

[56] References Cited

U.S. PATENT DOCUMENTS

| | | | |
|---|---|---|---|
| Re. 33,357 | 9/1990 | Randall | 358/106 |
| 107,321 | 9/1870 | Atkinson | |
| 777,590 | 12/1904 | de Bonneville | |
| 809,582 | 1/1906 | Robinson | |
| 877,550 | 1/1908 | Clark | 99/631 |
| 942,932 | 12/1909 | Robinson | |
| 954,047 | 4/1910 | Powell | |
| 1,359,766 | 11/1920 | Stephen | |
| 1,378,058 | 5/1921 | Schaefer | |
| 1,384,356 | 7/1921 | Smith | |
| 1,422,708 | 7/1922 | Hodgdon et al. | |
| 1,457,007 | 5/1923 | Smith | |
| 1,637,830 | 8/1927 | Mannsdorff | |
| 1,641,993 | 9/1927 | Schaefer | |
| 1,644,448 | 10/1927 | Robinson | |
| 1,664,304 | 3/1928 | McCathron | |
| 1,681,737 | 8/1928 | Lindahl | |
| 1,695,420 | 12/1928 | Eckert | |
| 1,728,846 | 9/1929 | Westgaard | |
| 1,766,999 | 6/1930 | Johnston | |
| 1,886,061 | 11/1932 | Speidel | |
| 1,945,978 | 2/1934 | Palombo et al. | 146/49 |
| 1,966,501 | 7/1934 | Hoe | 146/49 |
| 2,231,543 | 2/1941 | McClung et al. | 146/49 |
| 2,262,383 | 11/1941 | Carlson | 146/50 |
| 2,326,356 | 8/1943 | Haslam | 146/201 |
| 2,499,291 | 2/1950 | Baumann | 146/49 |
| 2,569,607 | 10/1951 | Hardt | 146/50 |
| 2,613,712 | 10/1952 | Pearlman | 145/49 |
| 2,633,884 | 4/1953 | Carlstedt | 146/49 |
| 2,676,633 | 4/1954 | Lohre et al. | 146/49 |
| 2,794,472 | 6/1957 | Veenhuizen et al. | 146/49 |
| 2,860,371 | 11/1958 | Krull | 17/5 |
| 3,134,413 | 5/1964 | Dorsa et al. | 146/49 |
| 3,134,414 | 5/1964 | Winroth | 146/50 |
| 3,480,057 | 11/1969 | Wilhelm | 146/231 |
| 3,496,976 | 2/1970 | Nielsen | 146/50 |
| 3,581,887 | 6/1971 | Radutsky et al. | 209/73 |
| 3,762,308 | 10/1973 | Greene et al. | 99/632 |
| 3,765,533 | 10/1973 | Stephens et al. | 209/73 |
| 3,848,524 | 11/1974 | Semrow | 99/631 |

(List continued on next page.)

FOREIGN PATENT DOCUMENTS

| | | |
|---|---|---|
| 18457 | 1/1914 | Denmark . |
| 2558690 | 8/1985 | France . |
| 312877 | 6/1918 | Germany . |
| 493625 | 3/1930 | Germany . |
| 54-145164 | 11/1979 | Japan . |
| 745157 | 2/1956 | United Kingdom . |
| 941124 | 11/1963 | United Kingdom . |
| 1288266 | 9/1972 | United Kingdom . |
| 1330132 | 9/1973 | United Kingdom . |
| 1393061 | 5/1975 | United Kingdom . |
| 1401289 | 7/1975 | United Kingdom . |
| 1449755 | 9/1976 | United Kingdom . |
| 1534590 | 12/1978 | United Kingdom . |
| 2022817 | 12/1979 | United Kingdom . |

*Primary Examiner*—Anthony J. Weier
*Attorney, Agent, or Firm*—Thomas Hooker, P.C.

[57] ABSTRACT

A potato peeling system includes a drum-type batch peeler, an unpeeled potato infeed assembly upstream from the batch peeler and a peeled potato discharge assembly downstream from the batch peeler. The batch peeler includes a rotary plate and a vertically adjustable cylindrical liner with a number of vertically spaced bands of different abrasive material. A drive moves the liner up and down to position a selected abrasive band above the plate for peeling.

14 Claims, 8 Drawing Sheets

U.S. PATENT DOCUMENTS

| | | | |
|---|---|---|---|
| 4,122,951 | 10/1978 | Alaminos | 209/545 |
| 4,152,767 | 5/1979 | Laliotis | 364/560 |
| 4,164,291 | 8/1979 | Carlow | 414/136 |
| 4,168,005 | 9/1979 | Sandbank | 209/552 |
| 4,184,598 | 1/1980 | Cowlin et al. | 209/705 |
| 4,205,752 | 6/1980 | Malvick et al. | 209/564 |
| 4,221,297 | 9/1980 | Aranda Lopez et al. | 209/576 |
| 4,251,555 | 2/1981 | Kroenig | 426/231 |
| 4,271,968 | 6/1981 | Mehrkam et al. | 209/564 |
| 4,281,764 | 8/1981 | Fowler, Jr. | 209/557 |
| 4,308,959 | 1/1982 | Hoover et al. | 209/563 |
| 4,348,277 | 9/1982 | Cowlin et al. | 209/705 |
| 4,350,442 | 9/1982 | Arild et al. | 356/51 |
| 4,351,437 | 9/1982 | Long | 209/545 |
| 4,368,462 | 1/1983 | Crawley | 340/723 |
| 4,391,185 | 7/1983 | Stanley | 99/489 |
| 4,442,764 | 4/1984 | Bos et al. | 99/633 |
| 4,450,760 | 5/1984 | Wilson | 99/536 |
| 4,493,105 | 1/1985 | Beall et al. | 382/21 |
| 4,493,420 | 1/1985 | Dennis | 209/587 |
| 4,520,702 | 6/1985 | Davis et al. | 83/71 |
| 4,581,632 | 4/1986 | Davis et al. | 358/106 |
| 4,581,762 | 4/1986 | Lapidus et al. | 382/22 |
| 4,626,677 | 12/1986 | Browne | 250/514 |
| 4,687,107 | 8/1987 | Brown et al. | 209/556 |
| 4,687,326 | 8/1987 | Corby, Jr. | 356/5 |
| 4,710,389 | 12/1987 | Dornow | 426/231 |
| 4,735,323 | 4/1988 | Okada et al. | 209/582 |
| 4,738,175 | 4/1988 | Little et al. | 83/71 |
| 4,776,466 | 10/1988 | Yoshida | 209/565 |
| 4,790,022 | 12/1988 | Dennis | 382/8 |
| 4,831,922 | 5/1989 | Cogan et al. | 99/486 |
| 4,889,241 | 12/1989 | Cogan et al. | 209/552 |
| 4,963,035 | 10/1990 | McCarthy et al. | 382/28 |
| 4,998,467 | 3/1991 | Kovach | 99/632 |
| 5,020,675 | 6/1991 | Cowlin et al. | 209/538 |
| 5,085,325 | 2/1992 | Jones et al. | 209/580 |
| 5,090,576 | 2/1992 | Menten | 209/587 |
| 5,106,641 | 4/1992 | Bichel | 426/483 |
| 5,277,320 | 1/1994 | Corkill et al. | 209/511 |
| 5,305,895 | 4/1994 | Hermann | 209/586 |
| 5,307,738 | 5/1994 | Amstad | 99/625 |
| 5,318,173 | 6/1994 | Datari | 209/580 |
| 5,415,083 | 5/1995 | Nagaoka | 99/491 |
| 5,662,034 | 9/1997 | Fuhrman | 99/633 |

POTATO PEELING SYSTEM

This is a divisional of application Ser. No. 08/613,219 filed on Mar. 8, 1996, now U.S. Pat. No. 5,662,034.

FIELD OF THE INVENTION

The invention relates to potato peeling systems using drum-type batch peelers.

DESCRIPTION OF THE PRIOR ART

Drum-type batch potato peelers typically include a cylindrical drum with an abrasive liner mounted on the inner surface of the drum. A rotary floor or plate is provided at the bottom of the drum. A batch of potatoes is placed in the drum, rotated by the floor and thrown up by centrifugal force against an abrasive liner. Frictional contact between the potatoes and the liner peels the potatoes. After the batch has been peeled for a period of time, the peeled potatoes are discharged for subsequent processing.

Conventional batch peelers use a single abrasive liner for peeling. The liner has a single grade of abrasive, typically a coarse sand-like abrasive, a medium sand-like abrasive or a soft fiber brush. Different grades of abrasive are required in order to peel potatoes having different types of skin. For instance, spring potatoes have delicate skins and are best peeled using a medium abrasive or brush liner. Potatoes with thick and tough skins are best peeled using a coarse abrasive liner.

The liners in conventional batch peelers are secured to the drums during peeling. In order to change over a peeler to a different abrasive, it is necessary to remove the machine from production, open the machine, unbolt the incorrect abrasive liner mounted in the machine, remove the liner and then insert and attach a new liner with the proper abrasive. This is a time-consuming and costly operation, especially when the peeler is used in continuous production of peeled potatoes.

The rotary floor or plate of conventional drum-type batch peelers rotates at a fixed speed during filling of the peeler, peeling and discharge of peeled potatoes from the peeler. The fixed speed is relatively high in order to efficiently peel potatoes. The high speed rotation of the plate is likely to injure the potatoes when batches are fed into the peeler and when peeled potatoes are discharged from the peeler.

Conventional potato peeling systems are not adjustable during operation other than by varying the length of time the potatoes are in the peeler. The inflexibility means that a machine set up to peel a potato with a particular type of skin and surface configuration cannot be easily converted to peel a potatoes with different types of skin.

SUMMARY OF THE INVENTION

The invention is an improved potato peeling system using an adjustable drum-type batch peeler. The peeler includes an interior liner having a number of vertically spaced interior bands of different abrasive and a drive for raising and lowering the liner in the peeler to position a selected abrasive band above the rotary plate during peeling. A band is selected to meet the peel requirements of the potatoes being peeled. The disclosed peeler includes an adjustable liner with three abrasive bands, a rough abrasive grit band, a medium abrasive grit band, and a brush band.

The rotary bottom plate of the peeler is driven by an adjustable speed drive so that the rotary speed of the plate may be slowed during feeding of a batch of potatoes into the peeler and during discharge of a batch of peeled potatoes from the peeler. Slowing the bottom plate reduces injury to the potatoes.

Each batch of unpeeled potatoes fed into the peeler is automatically weighed and is again weighed after peeling in order to determine the percentage of weight loss during peeling. The percentage of weight lost for successive batches is averaged by a computer control system and is then compared to a desired percentage weight loss. Peel parameters, including the peel time, the abrasive band or bands used during peeling and the speed of the rotary bottom plate are automatically adjusted in order to attain the desired percentage weight loss for successive batches of peeled potatoes.

The peeling system also includes a television monitoring assembly which automatically determines the amount of unpeeled skin left on peeled potatoes to assure that the potatoes meet minimum visual requirements. If peeling to a desired weight loss leaves too much or too little skin on the potatoes, then the peeling parameters are further adjusted to assure the peeled potatoes meet visual requirements.

The control system of the potato peeling system permits automatic adjustment of the peeling operation to preset standards, despite variation in the quality of potatoes in each peel batch. This feature assures efficient production-line operation with minimum manual intervention and reduced cost. Further, information concerning the peel properties of particular types of potatoes can be developed and stored for retrieval and future use.

Other objects and features of the invention will become apparent as the description proceeds, especially when taken in conjunction with the accompanying drawings illustrating the invention, of which there are 8 sheets and one embodiment.

DESCRIPTION OF THE PREFERRED EMBODIMENT

Figure 1:
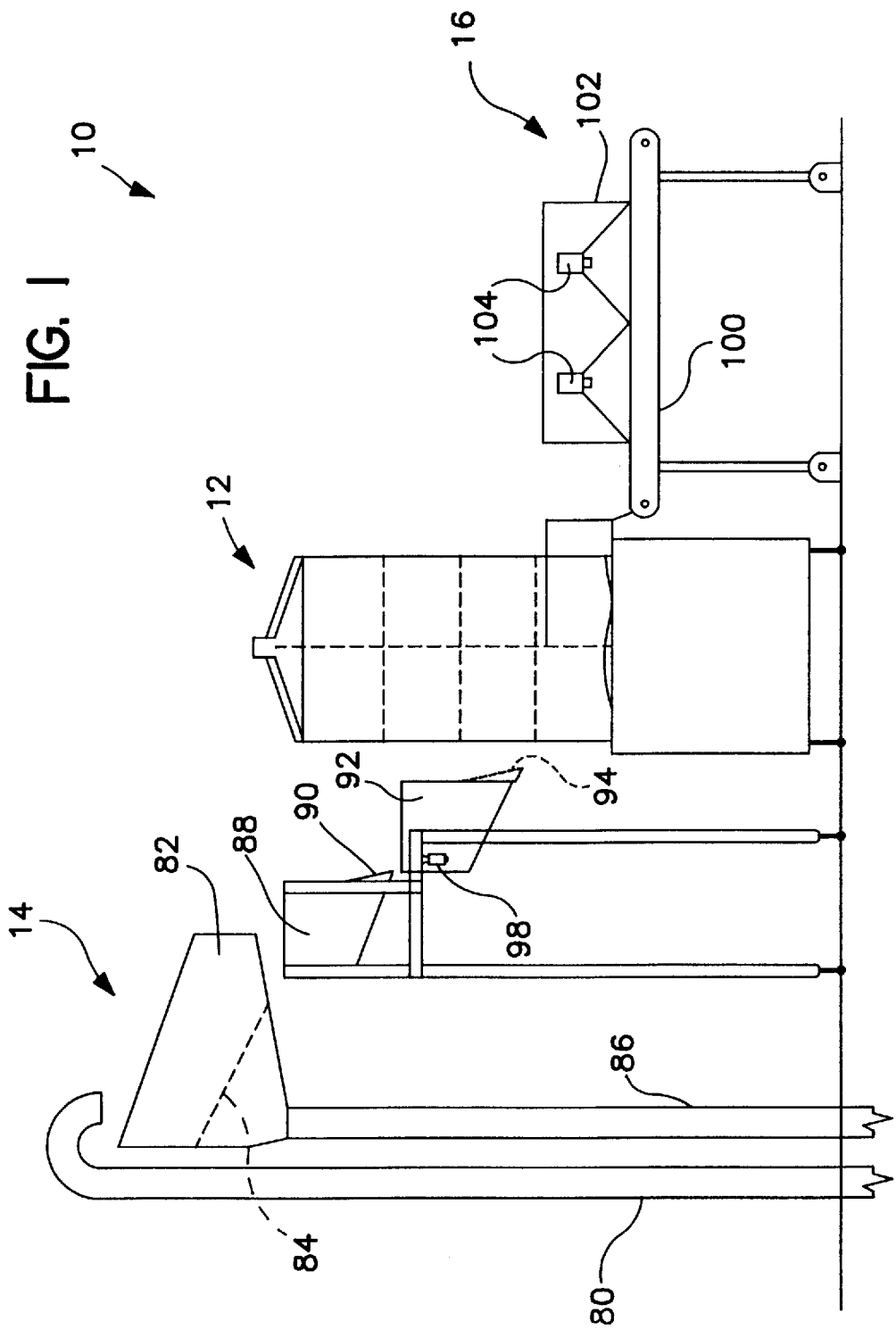
FIG. 1 is a side view of a potato peeling system according to the invention.

Potato peeling system 10 includes a drum-type batch peeler 12, an unpeeled potato infeed assembly 14 located upstream from the peeler and a peeled potato discharge assembly 16 located downstream from the peeler.

Batch peeler 12 includes a rectangular base 18 with a cylindrical drum 20 mounted on the top of the base and a vertically oriented cylindrical liner 22 fitted within the drum 20. The bottom of the drum is open. The liner 22 has a close sliding fit within the drum and when lowered extends partially into base 18. Liner drive 24 moves the liner vertically between a fully raised position shown in FIG. 6 and a fully lowered position shown in FIG. 3.

Potato driving rotary plate 26 is located at the bottom of the outer drum and is spaced a short distance inwardly from the drum to provide a circumferential gap between the plate and drum sufficiently wide to permit vertical movement of the liner. The plate includes an upwardly formed elliptical portion which, when rotated, drives or throws potatoes in the peeler against an abrasive band on the interior of the liner to peel the potatoes.

Figures 7, 8:
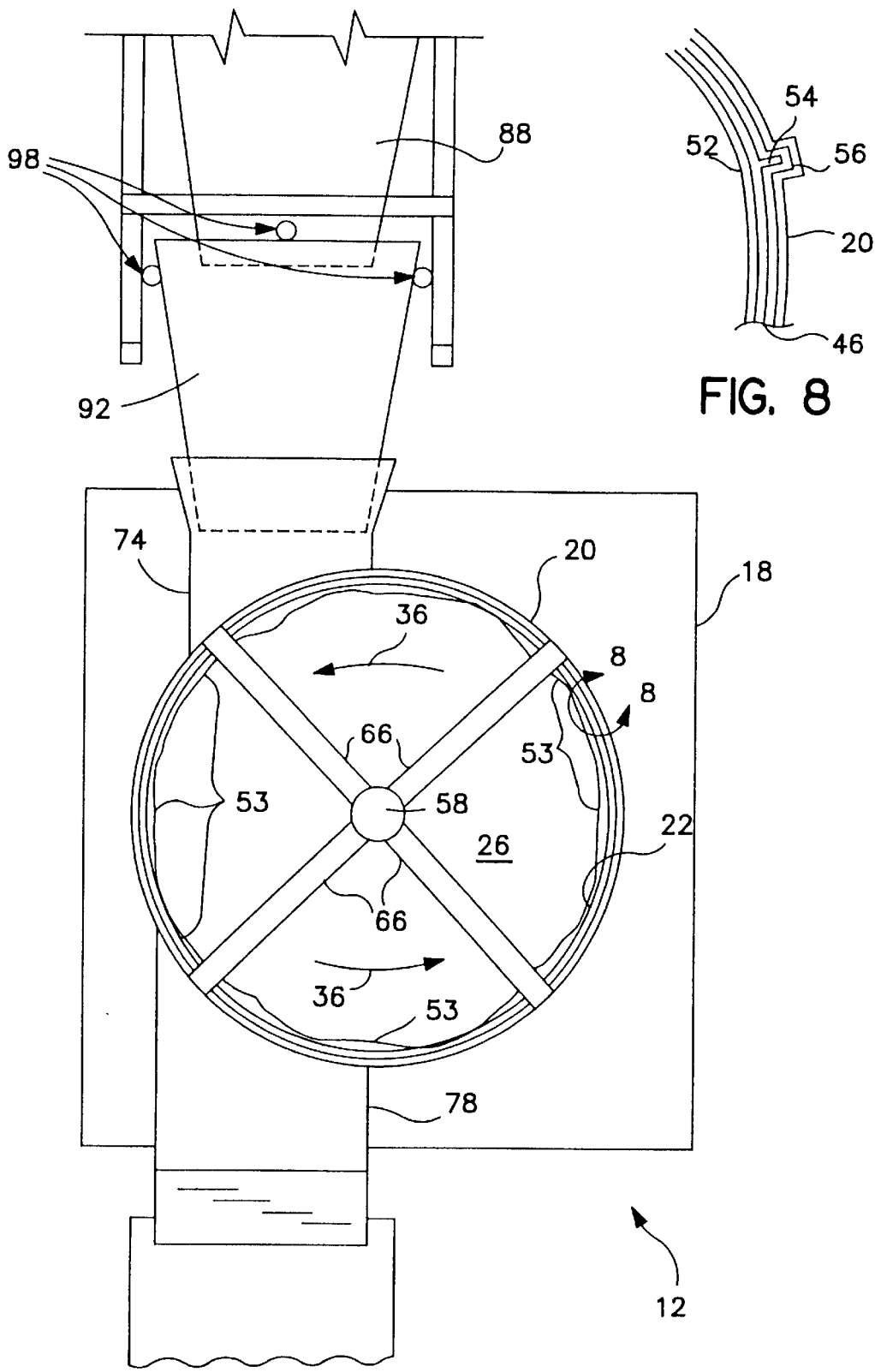
FIG. 7 is a top view of the peeler shown in FIG. 6.
FIG. 8 is an enlarged view of the portion of FIG. 7 in line 8—8.
Figure 9:
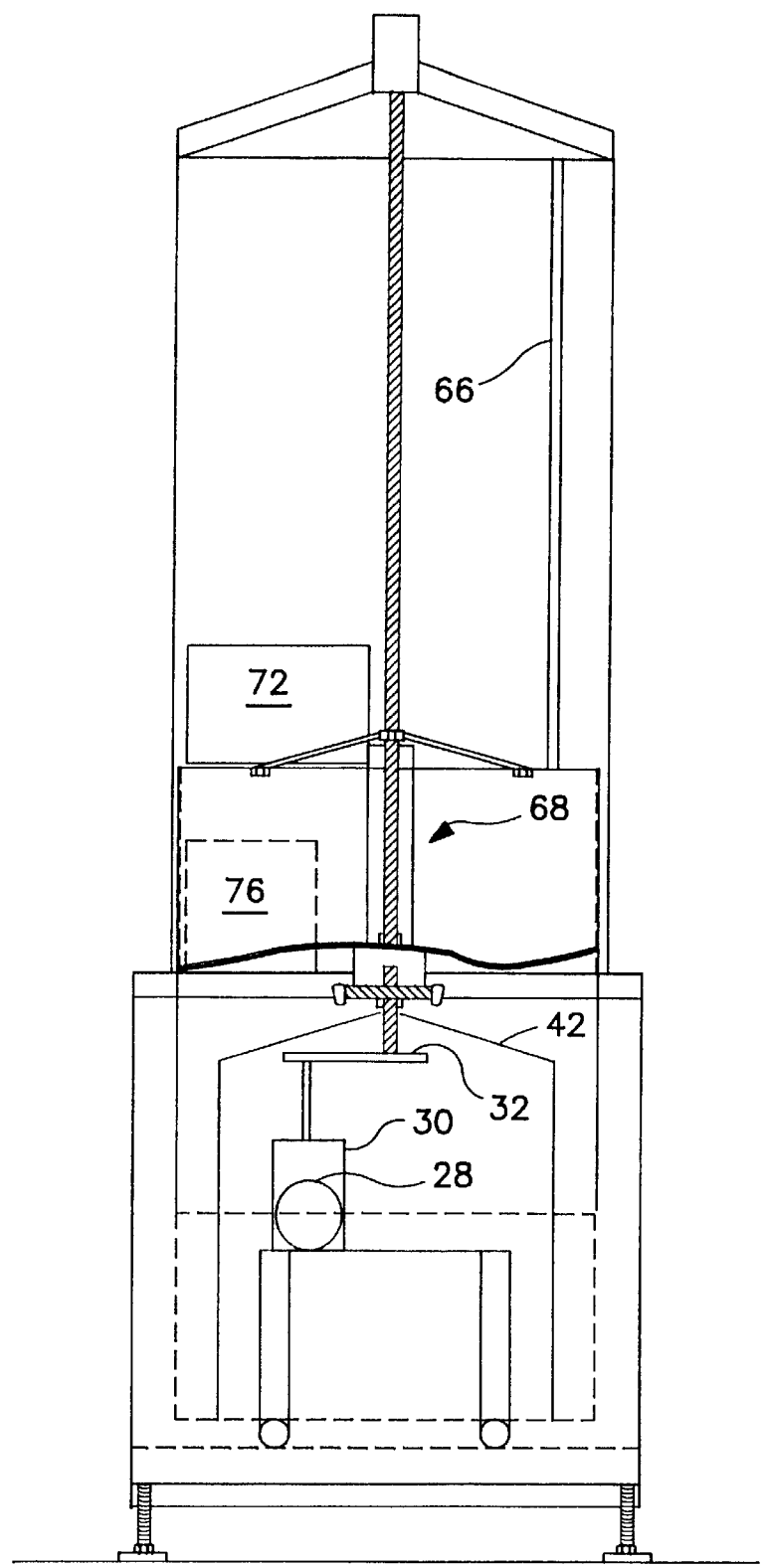
FIG. 9 is a sectional view taken generally along line 9—9 of FIG. 3.

Plate drive 26 is located in base 18 and includes drive motor 28, gear box 30 and drive train 32 connected to a drive shaft 34 supporting the plate. Shaft 34 is mounted on the base through a suitable bearing so that operation of motor 28 rotates plate 26 in the direction of arrows 36 as shown in FIG. 7. Bearing socket 38 is mounted on the top of plate 26 above shaft 34.

The plate drive 40 is located in a sheet metal shroud 42 with shaft 34 extending outwardly through a central opening in the shroud. The shroud protects the drive from liquid and peelings falling down from drum 20. The liquid and peelings are collected in a drain pan 44 mounted on the bottom of base 18 and are removed.

Liner 22 includes an outer cylindrical metal tube or body 46 having a sliding fit in drum 20. Three vertically spaced bands of abrasive peeling material are secured on the interior cylindrical surface of tube 46 with a brush band 48 located at the bottom of the tube, a medium abrasive band 50 located at the middle of the tube and a coarse band located at the top of the tube. The lower brush band is formed of short inwardly facing synthetic fibers, which may be nylon fibers, having a length of about ⅛ to 3/16 inches. The center medium abrasive band comprises a medium abrasive grit adhered to the tube 46. The upper coarse abrasive band 52 comprises a relatively coarse abrasive grit. The brushes and grits attached to liner 22 are each used in conventional single band batch peelers and need not be described further. The bands may be formed of other peeling materials, if desired. Inwardly facing elliptical projections 53 are spaced around the abrasive bands to tumble potatoes and improve peeling.

A number of anti-rotation vertical ribs 54 are secured to the outer surface of tube 46 and slide up and down in vertical slots 56 formed in liner 22. The ribs prevent potatoes thrown up against an abrasive band during peeling from rotating the tube in the drum. Only one rib is shown. See FIG. 8. If desired, other types of anti-rotation connections between the tube and drum may be used.

The liner drive 24 includes a drive motor 58 mounted on the top of drum 20 above bearing socket 38 by a number of radial support arms 60 extending from the top of the drum to the motor. The output shaft of motor 58 is connected to an elongate threaded positioning shaft 62 having a lower end seated in socket 38 to permit relative rotation between the shaft and plate 26. Drive nut 64 is threadably mounted on shaft 62 and is connected to the top of liner 22 by a number of radial arms 66. Actuation of drive 24 rotates positioning shaft 62 causing drive nut 64 to move vertically. Movement of drive nut 64 raises and lowers body 46 relative to plate 26. Actuation of drive 24 extends and contracts body 46 relative to plate 26.

Vertically extendable and contractable drive 24 is connected between liner body 46 and plate 26. The drive is connected to the body through arms 66 and is connected to the plate through arms 60, drum 20, base 18, and plate drive 40. Actuation of the drive moves the liner vertically relative to the vertically fixed plate. It is contemplated that a drive could move the plate vertically relative to a fixed liner in order to position the plate adjacent to a desired abrasive band for peeling.

Figure 3:
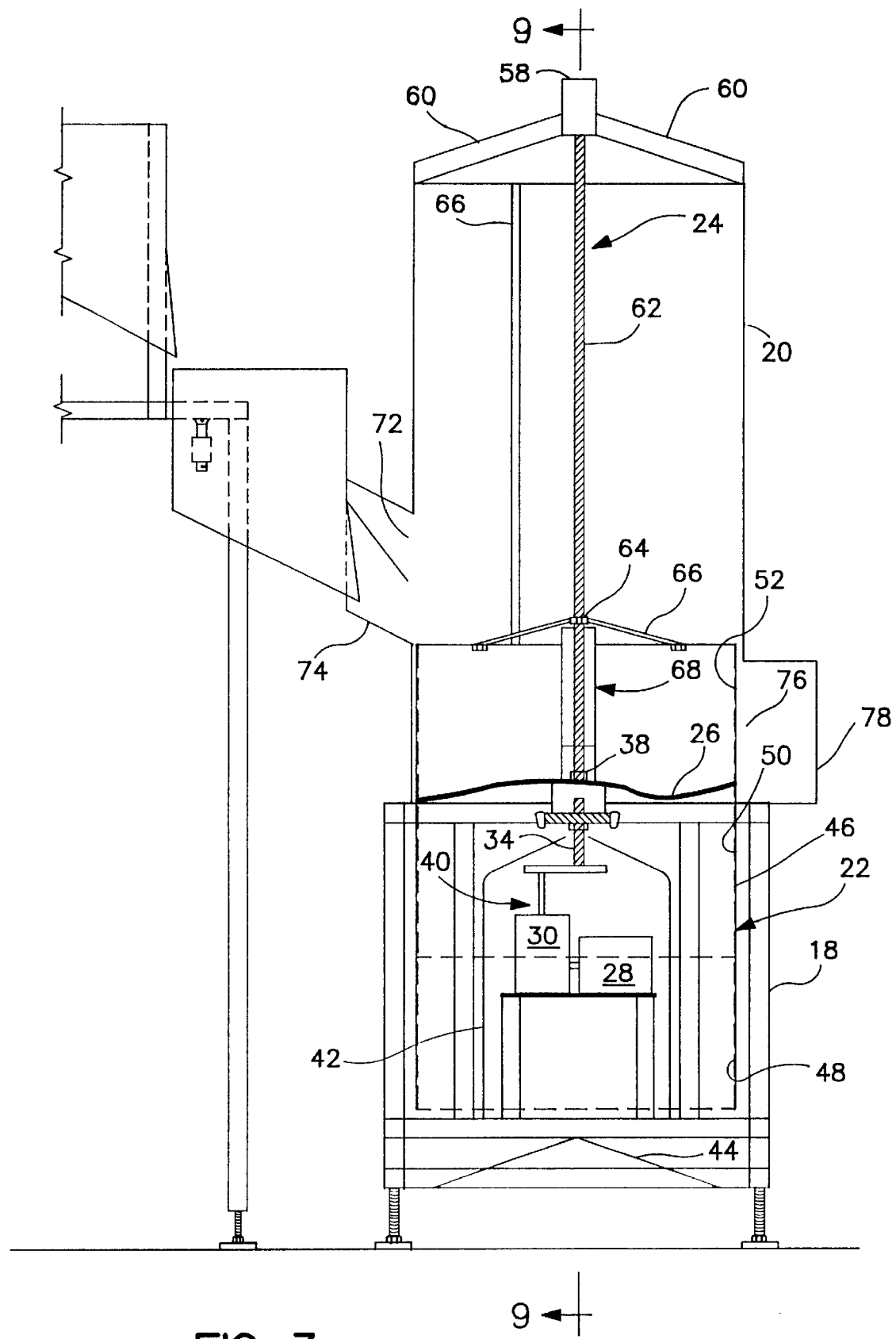
FIGS. 3–6 are sectional views taken generally along line 3—3 of FIG. 2 showing the peeler in different positions.
Figure 4:
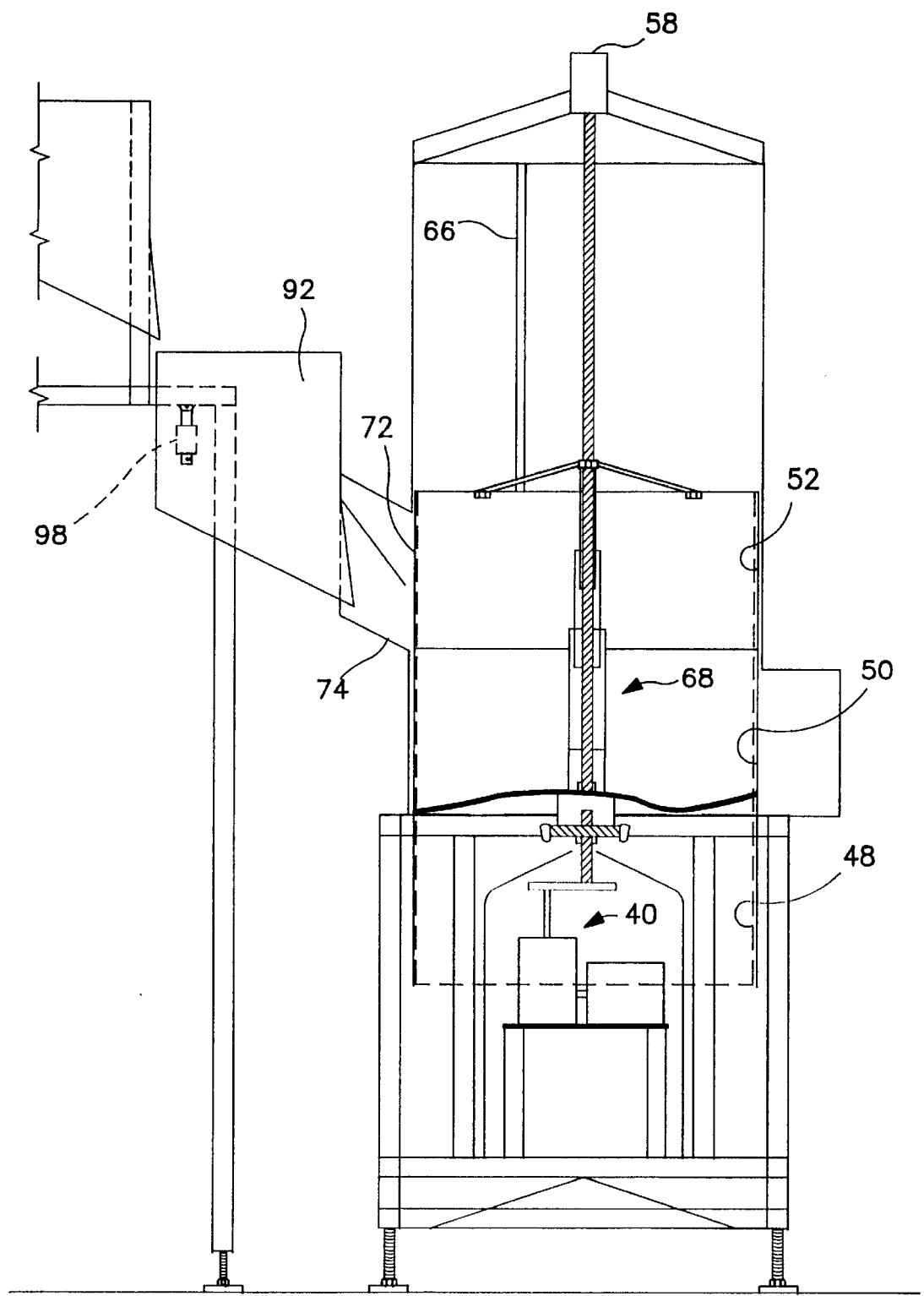
Figure 5:
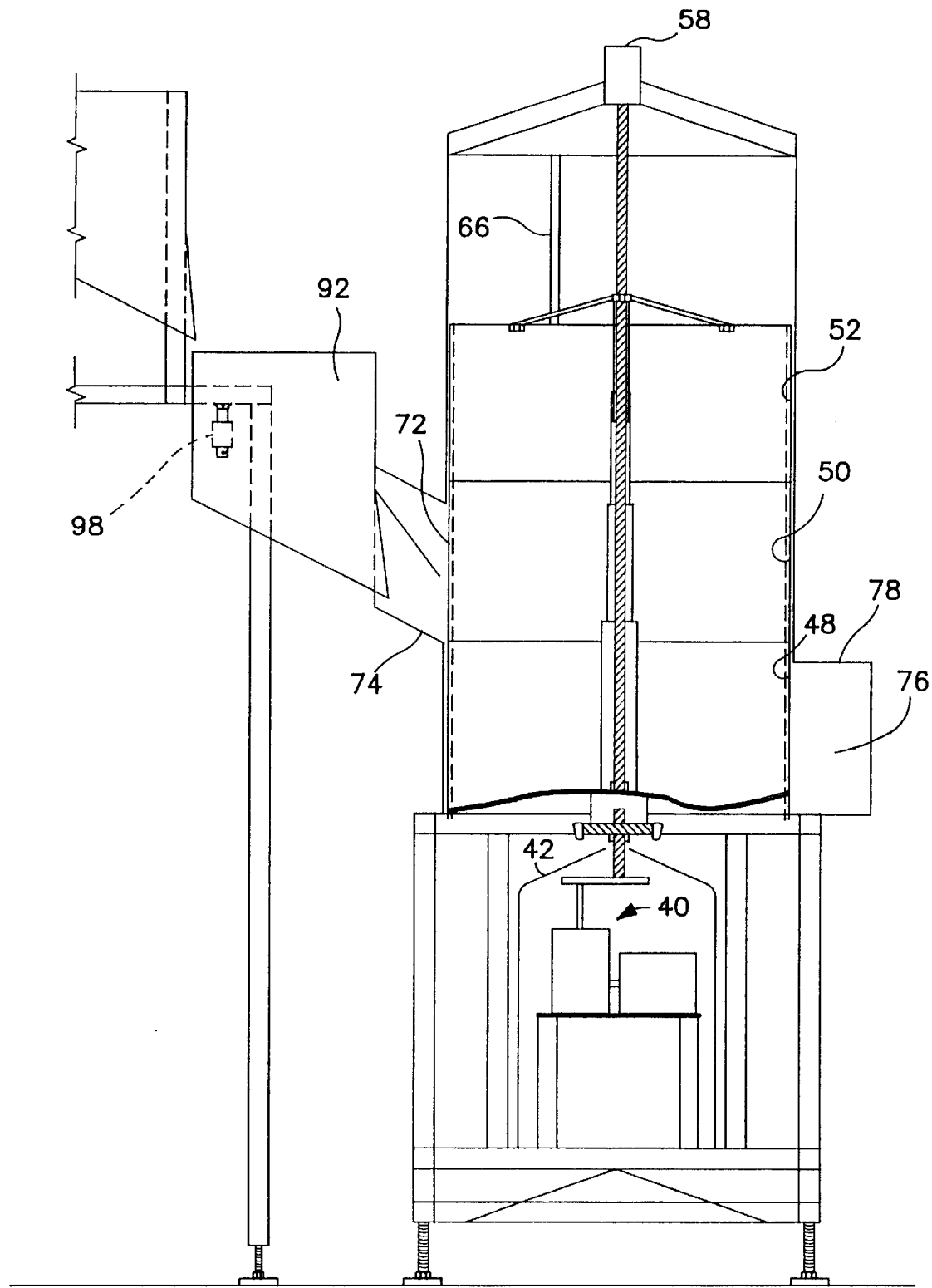
Figure 6:
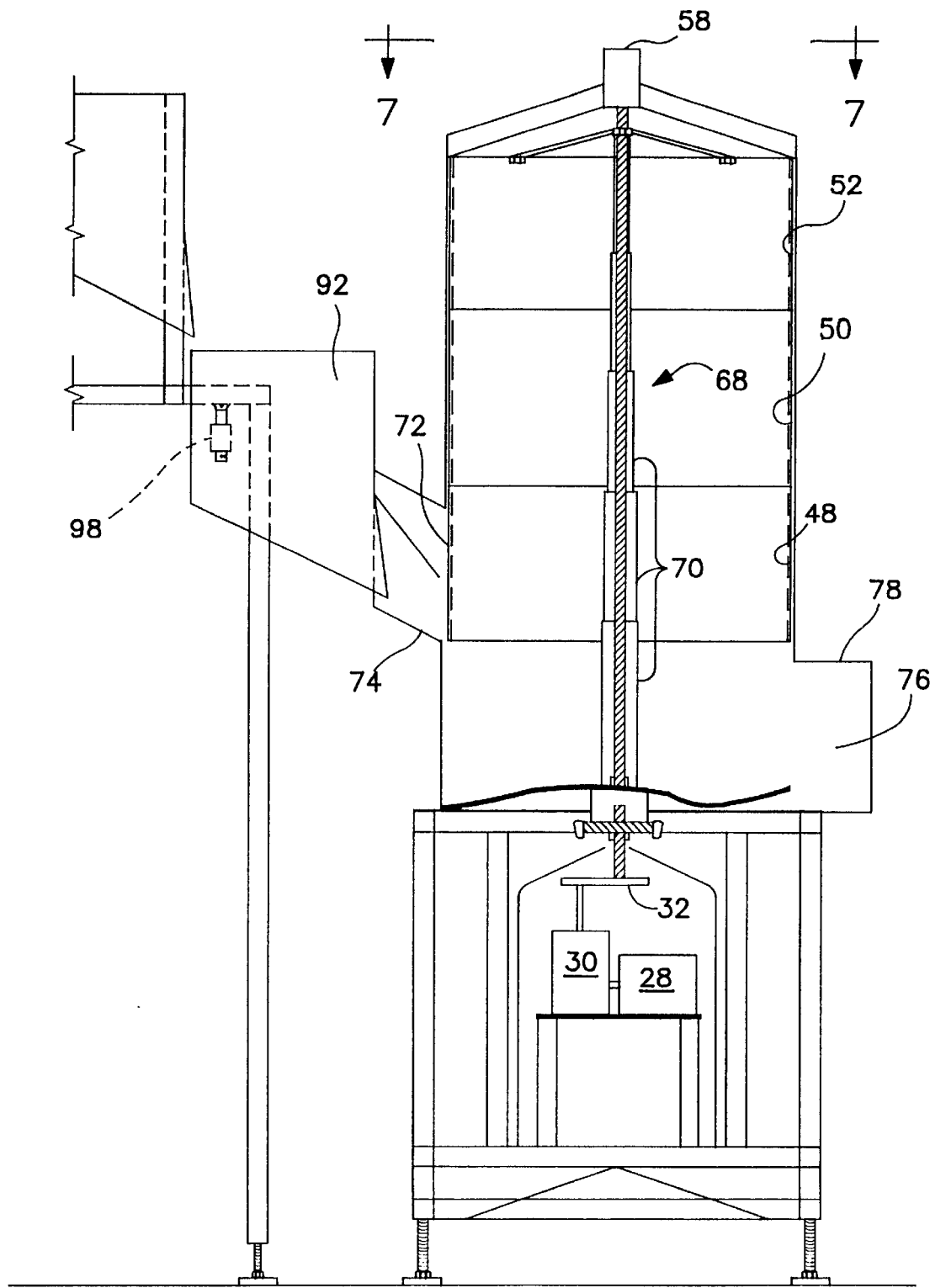

A collapsible shaft shroud 68 surrounds the portion of shaft 62 extending between plate 26 and drive nut 64 and includes a number of nested tubular segments 70. The shroud protects the shaft 62 from liquid and peelings generated during operation of the peeler 12 and prevents potatoes from contacting the shaft. It has a maximum height extending from the plate on the top of the drum 20 as shown in FIG. 6 and a minimum collapsible height equal to approximately the height of one band, as shown in FIG. 3.

Figure 2:
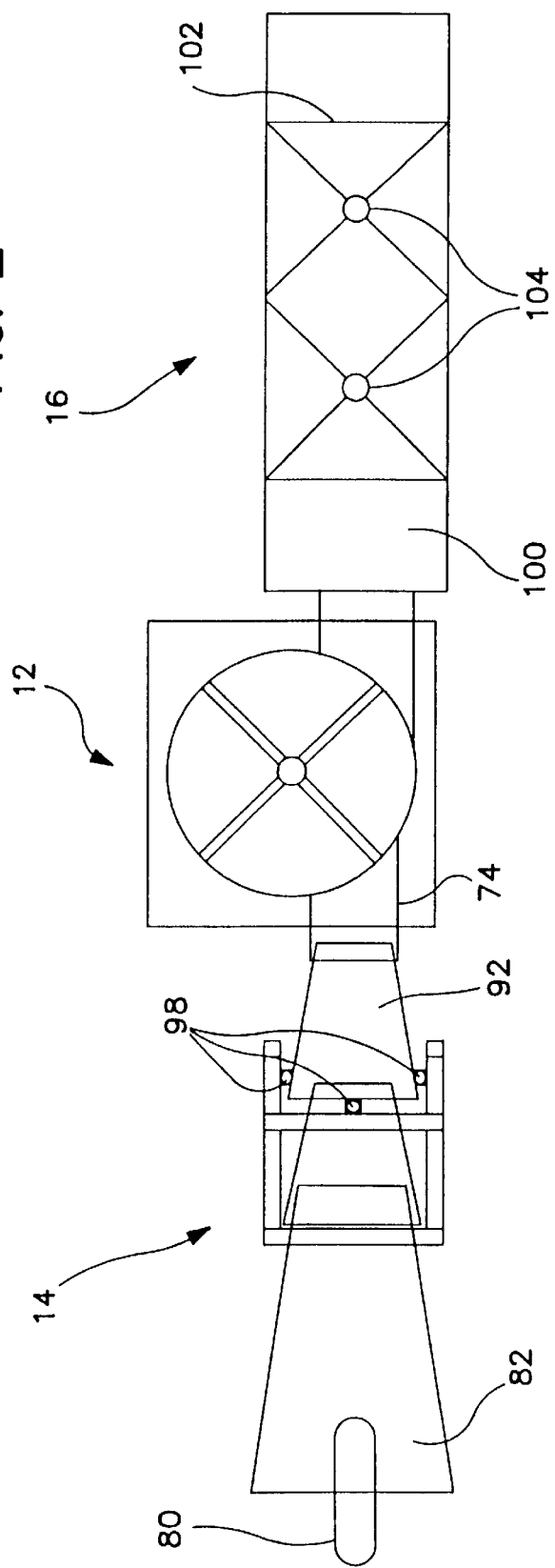
FIG. 2 is a top view of FIG. 1.

A potato inlet opening 72 is provided in drum 20 a distance above plate 26 equal to the vertical height of the upper band 52. See FIG. 3. Potato inlet chute surrounds opening 72 and extends upwardly from the opening. As shown in FIGS. 2 and 7, chute 74 extends away from one side of the drum so that potatoes discharged through the chute and into the liner are grouped to one side of the central threaded shaft. The chute discharges the potatoes into the peeler in generally the same direction the plate 26 moves below the opening 72, to reduce injury to the potatoes during charging of the peeler.

Potato discharge opening 76 is provided in drum 20 above plate 26 and directly across opening 72, on the same side of the shaft 62 as opening 72. Potato discharge chute 78 surrounds discharge opening 76 and extends outwardly from one side of the drum to receive potatoes thrown outwardly by rotation of plate 26 when the liner 22 is fully raised as shown in FIG. 6. The peeled potatoes are thrown radially outwardly by rotation of plate 26 and are guided into the chute with minimum injury.

Infeed assembly 14 includes a vertical infeed pipe 80 with a rotary auger (not illustrated) in the pipe operable to lift unpeeled potatoes and water to elevated flume 82. The flume is provided with a grate 84 which permits the water to drain away through return pipe 86. Unpeeled potatoes are discharged from the flume into elevated storage hopper 88 having an outlet door 90 located above weigh hopper 92. The weigh hopper includes a discharge door 94 at the lower end of the hopper located in inlet chute 74 of peeler 12. Doors 90 and 94 are selectively opened and closed by door drives (not illustrated).

Both hoppers 88 and 90 are supported on frame 96. Weigh hopper 92 is secured to the frame by a number of load cells 98. Load cells 98 are connected to a control circuit (not illustrated) which determines the weight of a batch of unpeeled potatoes held in the weigh hopper for discharge into the peeler.

The discharge assembly 16 includes a weigh belt conveyor 100 extending downstream from discharge chute 78. Television camera housing 102 is positioned above weigh belt conveyor 100 and supports a pair of television viewing cameras 104. The cameras are spaced along the length of the conveyor and have widths of field extending across the width of the conveyor belt. As peeled potatoes are tumbled along conveyor 100, cameras 110 take instantaneous pictures of the potatoes against a white background. Remaining skin on the potatoes is shown in the pictures as dark areas. The cameras are connected to circuitry which counts the number of pixels in each dark area and then sums the number of dark-area pixels to generate an output proportional to the area of unpeeled skin for each batch of peeled potatoes discharged from peeler 12.

Operation of the potato peeling system 10 is automatically controlled by a computer system responsive to a number of inputs to maximize peeling efficiency in accordance with peel standards for particular types of potatoes. The computer system includes a programmable logic controller (PLC) responsive to inputs including the weight of a batch of unpeeled potatoes delivered to the peeler from weigh hopper 92 as determined by load cells 98, the weight of the peeled batch of potatoes as determined by the weigh belt conveyor 100 and the area of unpeeled skin left on the peeled potatoes in the batch as determined by counting the dark pixels viewed by cameras 104.

The operation of the batch peeler may be controlled by the PLC or manually to vary the rotary speed of bottom plate 26, the duration of the peel for each batch, and the time during the peel the potatoes are peeled against a particular abrasive band.

Typically, the rotational speed of the plate 26 is slowed to approximate the velocity of the potatoes as they are discharged into the peeler in order to reduce impact injury to the potatoes. The rotational speed of plate 26 is also slowed during discharge to reduce impact injury.

The operation of the potato peeling system will now be described.

Unpeeled potatoes are delivered to storage hopper 88 and are discharged from the hopper in batches into the weigh hopper 92 by opening door 90. The load cells 98 determine the weight of each batch of unpeeled potatoes prior to discharge into peeler 12.

Prior to discharge of a batch of potatoes into the peeler, the liner drive motor 58 is actuated to fully lower liner 22 to the position of FIG. 3 where the top of the liner is located below inlet opening 72. When in this position, the liner does not obstruct discharge of a batch of potatoes from hopper 92 into the peeler. Also, the speed of drive motor 28 is reduced to reduce the rotational speed of plate 26 to approximate the speed of the potatoes as they fall down through chute 74 and opening 72 and onto the plate. In this way, impact injury to the unpeeled potatoes due to the fall is reduced. For instance, for a liner having an interior diameter of about three feet where the bottom of the inlet opening 72 is approximately 16 inches above plate 26 the rotational speed of the plate may be slowed to about 52 rpm.

With the liner lowered and plate speed reduced, discharge door 94 is opened to allow the batch of weighed unpeeled potatoes in the storage hopper to fall into the peeler. After the potatoes are delivered into the peeler, motor 58 is actuated to raise the liner 22 to position either band 50 or 52 above plate 26, if the potatoes are to be peeled by the fine abrasive grit or by the brush bands. The motor is not actuated if the potatoes are to be peeled by coarse band 52. An abrasive band is positioned for peeling when the band faces and extends above the plate. With the proper band in place for peeling, motor 28 is accelerated to rotate plate 26 at a peeling speed of from 103 to 125 revolutions per minute for a three foot diameter peeler.

High speed rotation of the plate rotates and throws the potatoes outwardly against the band extending upwardly from the plate. The potatoes are not thrown higher than the top of the band. The potatoes are peeled as they move along the abrasive surface and across the inward projections 53. The projections 53 tumble the potatoes on the abrasive to improve peeling. Peeling is continued until a desired quality peel has been achieved. For instance, it may be necessary to peel the potatoes until all or nearly all of the potato peel has been removed. Alternatively, a lighter peel, with a greater amount of skin left on the potato, may be required. This type of peel could be advantageous where it is desirable to remove a minimum percentage by weight of potato during peeling, thereby maximizing the weight of the final food product made from the peeled potato.

With some thin-skinned potatoes, it may be advantageous to initiate the peel using one of the grit bands of abrasive 50 and 52 and then finishing the peel using the less abrasive and gentler brush band 48. This is easily accomplished by actuating motor 58 during peeling to raise the liner in the drum sufficiently so that the brush band is positioned above rotating plate 26. This operation may be performed during peeling without the necessity of slowing plate 26. Obviously, the drive 24 may be used to raise or lower the liner during peeling to facilitate peeling a given batch of potatoes using any or a number of the three bands, as required for a particular peel.

The peeler includes a conventional spray system (not illustrated) which delivers water into the liner during peeling to aid in peeling and discharge of peeled skin from the liner. The water and peelings fall down on to pan 44.

After peeling has been completed, drive 24 is actuated to fully raise the liner 22 in drum 20 and uncover the discharge opening 76. Continued rotation of plate 26, preferably slowed to prevent damage to the potatoes, discharges the batch of peeled potatoes through chute 78 and onto weigh belt conveyor 100. The conveyor moves the peeled potatoes downstream away from the peeler and spreads the potatoes across the conveyor. As the potatoes move along the conveyor sensors in the conveyor determine the weight the peeled potatoes. The control system compares the weight of the peeled batches with the weight of unpeeled batches when in the weigh hopper to determine the average percentage of weight lost for a number of batches. The system compares the determined average weight lost with the desired loss and then automatically adjusts the length of the peel, or in some cases, the abrasive band or bands used during peeling, in order to increase or decrease weight loss so that the actual weight loss matches the desired weight loss. This adjustment is performed automatically by the control system in accordance with the computer program for the particular peeler.

As the potatoes are fed along the weigh belt conveyor 100, cameras 140 take pictures of the potatoes and determine the percentage of skin remaining on the potatoes. The potatoes tumble as they move along the conveyor. The cameras take pictures of the potatoes in different positions to provide an accurate assessment of the percentage of skin remaining on the potatoes. If the percentage of skin remaining on the potatoes is greater than a visual standard, the control system automatically adjusts the peel parameters to remove more skin until the standard is met.

System 10 has been described in connection with peeling potatoes. The system and peeler 12 are particularly useful in peeling potatoes but may be used advantageously to peel other food products including fruits and vegetables.

While I have illustrated and described a preferred embodiment of my invention, it is understood that this is capable of modification, and I therefore do not wish to be limited to the precise details set forth, but desire to avail myself of such changes and alterations as fall within the purview of the following claims.

What I claim as my invention is:

1. The method of peeling food articles using a batch peeler having a vertical cylindrical member with an interior and a number of separate abrasive peeling bands extending around the interior of the member and formed from different quality peeling material wherein said abrasive bands are spaced vertically along the interior surface of said member, and a rotary plate located in the member, comprising the steps of:

A) charging food articles to be peeled into the member and onto the plate;

B) moving at least one of: (a) the plate and (b) the member in a vertical direction to position the plate adjacent the bottom of a first selected peeling band to be used during peeling;

C) rotating the plate to drive the articles on the plate outwardly and against the first selected peeling band to peel the articles; and D) discharging the peeled articles from the peeler.

2. The method of claim 1 including the step of:

E) relatively positioning the plate at the bottom of a second selected peeling band during peeling.

3. The method of claim 1 including the step of:

F) moving the member vertically while holding the plate against vertical movement during step B).

4. The method of claim 1 including the steps of:

G) rotating the plate at a high peeling speed during step C); and

H) rotating the plate at a slow speed during steps A) and D).

5. The method of claim 4 including the steps of:

I) rotating the plate at a speed of approximately 103 to 125 revolutions per minute during step C; and J) rotating the plate at a speed of approximately 52 revolutions per minute during steps A) and D).

6. The method of claim 1 including the step of:

K) restraining the member against rotation during step C).

7. A method of peeling food articles using a batch peeler having a vertical member extending around a rotary plate, an article support surface on the top of the plate and a plurality of cylindrical abrasive bands of different grade abrasive located within the member and each extending around the interior of the member, comprising the steps of:

A) loading food articles to be peeled into the member and onto the support surface of the plate;

B) rotating the plate to propel the articles on the support surface outwardly from the plate;

C) positioning a first abrasive band with the abrasive facing the plate, extending a distance upwardly above the plate and located in the path of articles propelled by the plate while positioning each other abrasive band away from the plate and out of the path of articles propelled by the plate, and then peeling articles propelled by the plate against the first abrasive band;

D) positioning a second abrasive band with the abrasive facing the plate, extending a distance upwardly above the plate and located in the path of articles propelled by the plate while positioning each other abrasive band away from the plate and out of the path of articles propelled by the plate, and then peeling articles propelled by the plate against the second abrasive band; and E) discharging peeled articles from the drum.

8. The method of claim 7 including a step of:

G) providing a grade of abrasive on the first band coarser then the grade of abrasive on the second band.

9. The method of claim 7 including a step of:

F) simultaneously moving all of the abrasive bands in a vertical direction.

10. The method of claim 7 including a step of:

F) moving the first abrasive band in a vertical direction away from the plate.

11. The method of claim 10 including a step of:

G) moving the second band in a vertical direction away from the plate.

12. The method of claim 10 including a step of:

G) moving all of said bands above the plate.

13. The method of claim 7 including the step of:

F) rotating the plate at approximately 103 to 125 revolutions per minute during peeling.

14. The method of claim 13 including the step of:

G) slowing rotation of the plate during loading and discharging of articles.

* * * * *